INVENTOR.
LEON RIEBMAN
BY Jacob Trachtman
ATTORNEY

INVENTOR.
LEON REIBMAN
BY Jacob Trachtman
ATTORNEY

United States Patent Office 3,202,920
Patented Aug. 24, 1965

3,202,920

MEANS FOR CONVERTING SIGNALS

Leon Riebman, Huntingdon Valley, Pa., assignor to American Electronic Laboratories, Inc., Colmar, Pa., a corporation of Pennsylvania Filed Dec. 13, 1961, Ser. No. 159,040
10 Claims. (Cl. 329—161)

Figure 1:
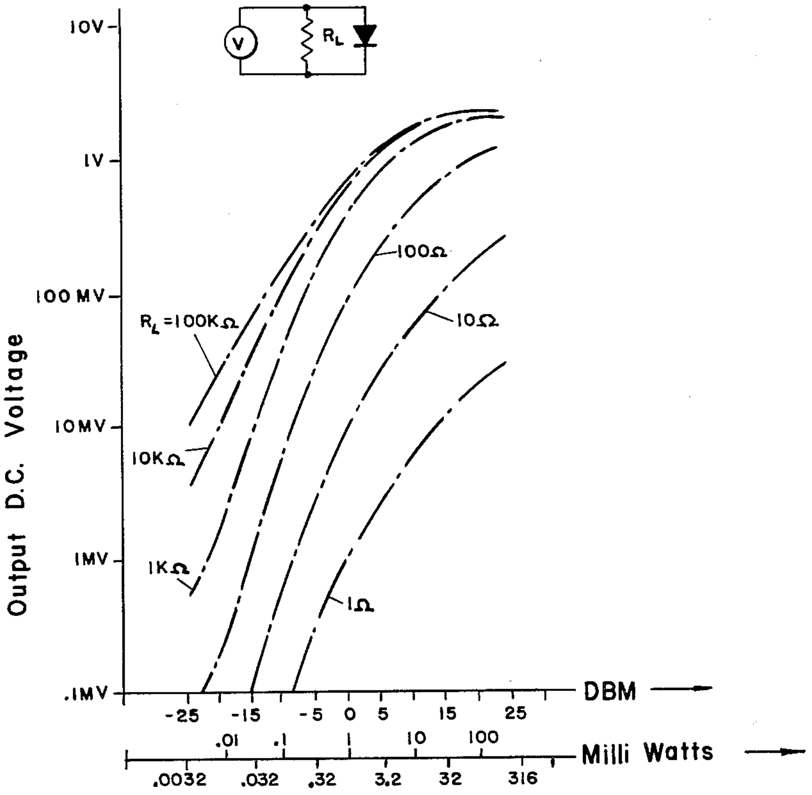

The invention relates to method and means for converting signals, and more particularly to the method and means for converting R.F. to D.C. signals.

In the present state of the art when a crystal detector is used at sufficiently high power levels for converting the power of an R.F. signal to a D.C. voltage output signal, a linear increase in output voltage is obtained by increasing the power converted by the crystal detector. Without increasing the power converted by the crystal, a D.C. amplifier must be used to obtain a higher D.C. voltage output than that provided alone by the crystal detector.

It is, therefore, a primary object of the invention to provide a new and improved method and means for yielding a higher D.C. voltage output signal for the same converted R.F. power by utilizing crystal detectors of the same type and without the addition of a D.C. amplifier.

Another object of the invention is to provide a new and improved method and apparatus which is simply and readily carried out for producing an increased voltage output signal for the same converted power of a radio frequency signal.

Another object of the invention is to provide a new and improved method and means for converting radio frequency signals to D.C. voltage output signals which may readily be used and applied in connection with various power transmission means.

Another object of the invention is to provide a new and improved method and means for converting R.F. to D.C. signals which provides for high efficiency and allows maximized conversion of the power of the R.F. signal being detected.

Another object of the invention is to provide a new and improved method and means for signal converting which may readily be modified and applied to various design circumstances and requirements and is relatively inexpensive to apply and maintain.

The above objects of the invention are achieved by providing a method for converting R.F. to D.C. signals which includes connecting in series for signal addition, a plurality of signal detecting units for converting an R.F. signal, in which each unit is characterized by providing a D.C. output voltage $E_{dc}$ according to the following equation, $$E_{dc}=AP^{m}$$

where P is the power of the R.F. signal which is converted by a respective one of said units, $m$ is an exponent having a value less than 1, and A is a proportionality factor.

The method includes arranging said detecting units to equally share the power of the R.F. signal to be converted and deriving a D.C. output signal $E'_{dc}$ from said units according to the following equation, $$E'_{dc}=r^{1-n}(BP_{T}^{n})$$

where $P_T$ is the total power of the R.F. signal which is converted by said units, $r$ is the number of series connected units connecting said R.F. signal, $n$ is an exponent having a value less than 1, and B is a proportionality factor.

The means for carrying out the invention comprises a signal transmission means for transmitting an R.F. signal, a plurality of signal detecting units connected in series for converting the R.F. signal transmitted by said transmission lines in which each unit provides a D.C. output voltage signal $E_{dc}$ according to the following equation, $$E_{dc}=AP^{m}$$

where P is the power of the R.F. signal which is converted by a respective one of said units, $m$ is an exponent having a value less than 1, and A is a proportionality factor. The signal detecting units are positioned with respect to the transmission means so that each of the units shares the power of the R.F. signal to be converted, and output means connected with the detecting units derive a D.C. output voltage signal $E'_{dc}$ from more than one of the series connected detecting units.

With the detecting units positioned to equally share the power of the converted R.F. signal, the D.C. output voltage $E'_{dc}$ derived from said output means is in accordance with the following equation, $$E'_{dc}=r^{1-n}(BP_{T}^{n})$$

where $P_T$ is the total power of the R.F. signal which is converted by said detecting units, $r$ is the number of series connected detecting units converting said R.F. signal, $n$ is an exponential factor having a value less than 1, and B is a proportionality factor.

A terminating means is provided for the signal transmission means for matching the impedance of the transmission means and providing optimum operating conditions.

The detector units illustrated are diode crystal detectors which are series connected and poled to provide an additive output signal voltage, while the transmission means may be a wave guide, strip line or coaxial line designed for transmission of R.F. signals. The diode crystal detectors operate in the region below the square law voltage detection region approaching the square law voltage detection region, or in the square law voltage detection region.

Figure 2:
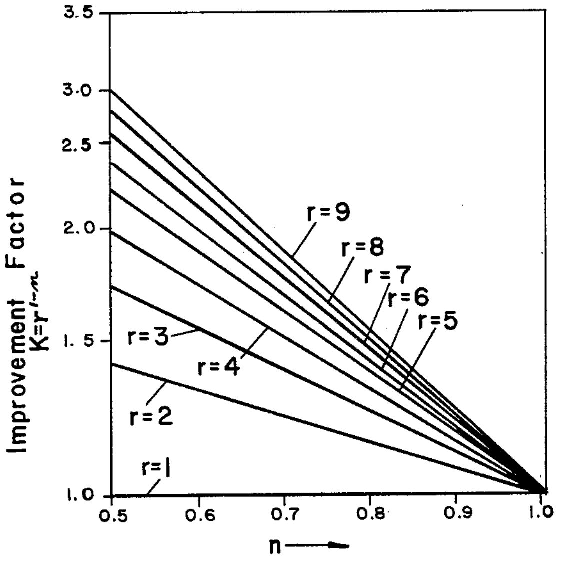
Figures 3, 4, 5, 6, 7A, 7B, 8A, 8B:
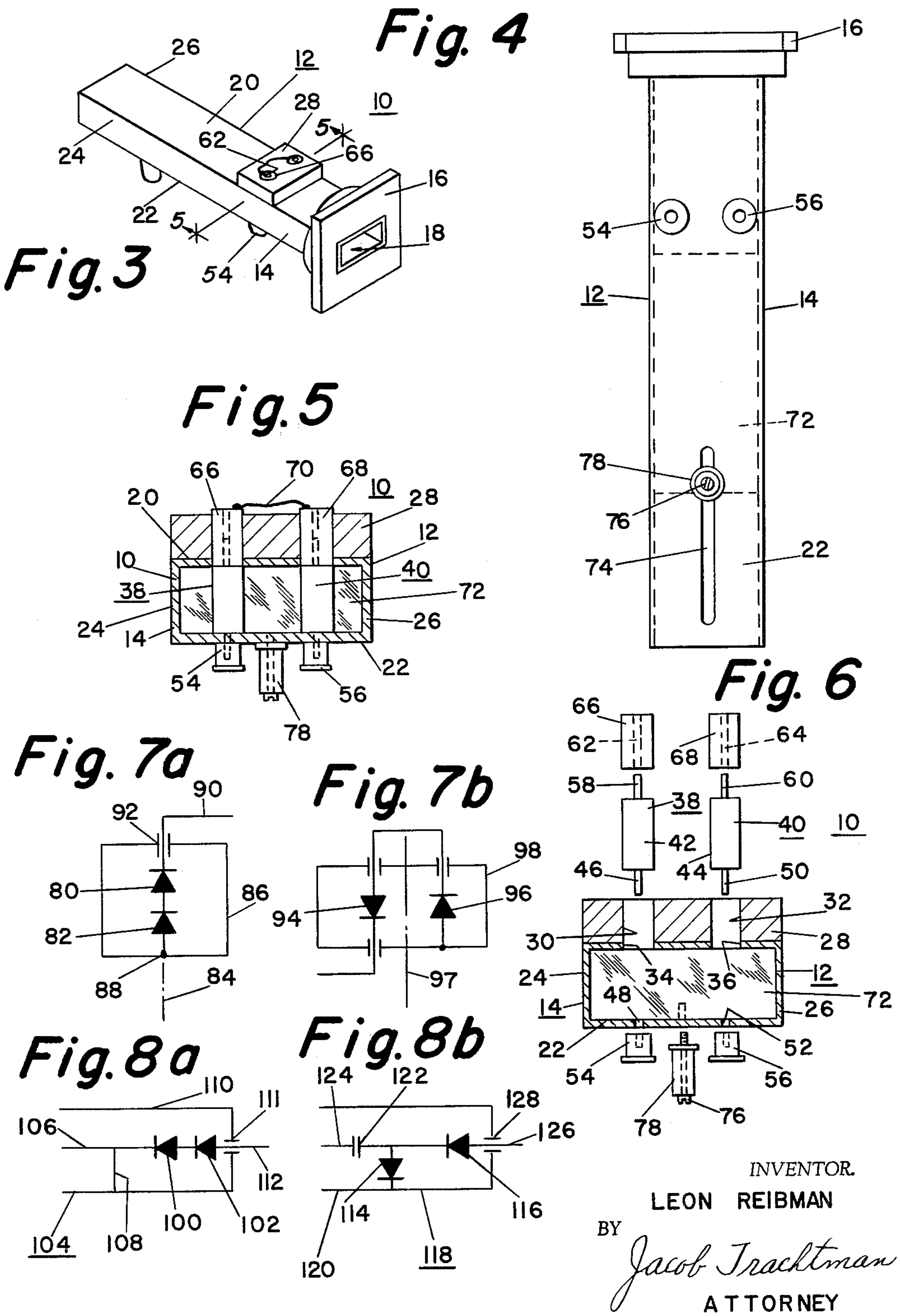

The foregoing and other objects of the invention will become more apparent as the following detailed description of the invention is read in conjunction with the drawings, in which:

FIGURE 1 is a graphic representation showing the plot of D.C. output voltage against input power of an R.F. signal for a diode crystal detector, FIGURE 2 is a graphic representation showing a plot of the improvement factor for signal output as a function of $n$ for combinations of two or more diode crystal devices utilized in accordance with the invention, FIGURE 3 is a perspective view of a means for converting signals in accordance with the invention, FIGURE 4 is an enlarged inverted plane view of the means shown in FIGURE 3, FIGURE 5 is an enlarged sectional view taken on the line 5—5 of FIGURE 3, FIGURE 6 is an exploded sectional view similar to the sectional view of FIGURE 5, and FIGURES 7*a*, 7*b*, 8*a* and 8*b* are schematic drawings showing various arrangements of diode crystal detector units in connection with rectangular wave guides and coaxial lines.

Like reference numerals designate like parts throughout the several views.

The D.C. output voltage delivered by a crystal diode device, such as the crystal diode devices currently available, depends upon the amount of converted power of the R.F. signal being detected. A relationship between the output voltage signal $E_{dc}$ and the R.F. signal power coverted by such a crystal diode is given by the following equation, $$E_{dc}=AP^{n}$$

where A is a relatively constant conversion or proportionality factor, and $n$ is an exponent depending upon input power. The value of $n$ varies between one-half and 1, approaching 1 as the input power is decreased.

The above relationship is shown by the graph of FIGURE 1 which was plotted for a Sylvania 1N358A diode crystal detector unit showing output D.C. voltage for various loads $R_L$ as R.F. power is varied from minus 25 db below 1 millowatt through 25 db above 1 milliwatt. The diode in its mount was matched to a VSWR of 1.2 or better at all times with the converted signal being a modulated continuous wave having a carrier frequency of 9375 megacycles transmitted by a wave guide.

In order to determine the value of the exponent $n$, consider the curve for the load resistance of 100,000 ohms shown in FIGURE 1. The values of output voltage against power level are given by the following chart.

| Power level: | Output voltage, mv. |
|---|---|
| −25 dbm | 9.5 |
| −20 dbm | 26.5 |
| −15 dbm | 67.0 |
| −10 dbm | 160 |
| −5 dbm | 355 |
| 0 dbm | 755 |
| +5 dbm | 1290 |

Since 5 db power change corresponds to a power ratio of 3.16, the table below gives $n$ for the different 5 db power ranges:

| Power Level | Ratio of Output Voltages | $n$ from $3.16^n$ = Ratio of Voltages |
|---|---|---|
| −25 to −20 dbm | 26.5/9.5=2.79 | .892 |
| −20 to −15 dbm | 67/26.5=2.53 | .807 |
| −15 to −10 dbm | 160/67=2.39 | .758 |
| −10 to −5 dbm | 355/160=2.22 | .693 |
| −5 to 0 dbm | 750/355=2.11 | .65 |
| 0 to +5 dbm | 1,290/750=1.72 | .471 |

From the above table, it is evident that $n$ varies from approximately one-half to 1 depending upon the power being detected, with $n$ approaching approximately one-half as the power converted is increased. When the exponent $n$ is 1, a voltage output signal from the diode detector is proportional to the power, which is proportional to the voltage squared. Thus, the detector operates as a square law voltage detector. When the value of $n$ is below 1, the detector operates in the detection region below the square law region and approaches the linear voltage detector region as the power is increased. Thus, when the exponent $n$ is equal to one-half, the output voltage is proportional to the square root of the power and operates as a linear voltage detector.

The invention provides a method for obtaining D.C. voltage output from diode crystal detectors or devices having the characteristics shown in FIGURE 1 without increasing the converted R.F. power, when such devices are operating below the square law region or in the linear voltage detection region. The increased output voltage is derived directly from the diode crystal detectors and does not require the use of amplifiers or any other such devices.

To achieve this result, the method provides for the connection in series of more than one of such crystal detectors poled to provide the addition of output voltages. Thus, if $r$ detectors are connected in this manner and arranged to equally share the total power converted by a number $r$ of connected detector units, the power P converted by each detector is given by, $$P = P_T/r$$

where $P_T$ is the total power converted by the $r$ diode detecting units. From the formula given previously, the output voltage $E_{dc}$ of each of the units is, $$E_{dc} = A(P_T/r)^n$$

Since each of the diodes is connected to provide addition of their output voltages, the total output voltage $E'_{dc}$ is $r$ times that of the voltage for one unit giving, $$E'_{dc} = rA(P_T/r)^n$$

This can also be written in the form, $$E'_{dc} = r^{1-n}(AP_T^n)$$

The improvement factor K for the D.C. voltage obtained by the invention is derived by dividing $E'_{dc}$ by $E''_{dc}$ to give, $$K = E'_{dc}/E''_{dc} = r^{1-n}$$

where $$E''_{dc} = AP_T^n$$

and $E''_{dc}$ is the D.C. voltage produced by only one of said units converting the total power $P_T$.

FIGURE 2 is a graph showing the improvement factor K obtained for two or more series connected crystal detector units which equally share the converted power. With $n$ plotted linearly along the abscissa and K plotted on a logarithmic scale along the ordinate, the graph for a particular number $r$ of detecting units is given by a straight line of negative slope. Thus, the improvment factor increases as $n$ approaches one-half and is equal to unity when $n$ equals 1. The improvement factor K increases also as the number $r$ of connected diode devices increases. However, the resulting increment of improvement decreases with the addition of each detecting unit, although the total improvement increases. The greatest increment in the improvement factor occurs when going from one detecting unit to two detecting units. The following chart shows the value of the improvement factor and its function of the number $r$ of series connected detecting units for the value of $n$ equal to one-half, or for the operation of the detecting units as linear voltage detectors.

| Number of detecting units $r$: | Improvement factor, $K = r^{1-n} = (r)^{1/2}$ |
|---|---|
| 1 | 1.00 |
| 2 | 1.414 |
| 3 | 1.732 |
| 4 | 2.000 |
| 5 | 2.236 |
| 6 | 2.450 |
| 7 | 2.646 |
| 8 | 2.828 |
| 9 | 3.000 |
| 10 | 3.162 |

Thus, the method of the invention provides for the use of detecting devices operating in the region below the square law voltage region, whereby an output D.C. voltage may be derived utilizing the same total power which is higher than that provided by the use of one such detecting device. The method thus avoids the use of amplifying means for the signal derived from cyrstal detectors and does not require increased in converted power to yield an increased output voltage.

FIGURES 3 to 6 disclose a signal converting means 10 of the invention which comprises a signal transmission means 12 comprising a wave guide section 14 having a connecting flange 16 and a rectangular cavity 18. The wave guide section 14 has top and bottom walls 20, 22 and side walls 24 and 26. A detector mounting block 28 is secured with the top wall 20 of the wave guide section 14 and is provided with a pair of cylindrical openings 30, 32 (see FIGURES 5 and 6) respectively which are in alignment with the pair of openings 34, 36 in the top wall 20 of the wave guide section 14 communicating with the cavity 18 of the wave guide section 14. A pair of diode crystal detecting units 38, 40 each having cylindrical body portions 42, 44 are respectively received through the openings 30, 34 and 32, 36 into the cavity 18 of the wave guide section 14. The lower lead 46 of the unit 38 is received through an opening 48 in the bottom wall 22 of the wave guide section 14 when the detecting unit 38 is positioned within the cavity 18, while the lower connecting lead 50 of unit 40 is similarly received through an opening 52 in the bottom wall 22 of the wave guide section 14. The ends of the leads of the units 38, 40 which extend through their respective openings 48, 52 are attached to terminal caps 54, 56 for securing the ends of the dectector units 38, 40 and delivering an output signal from the device 10.

The upper leads 58, 60 of the units 38, 40 are respectively received within and electrically contact the bore opening 62, 64 of a pair of metallic retaining cylinders 66, 68. The detecting units 38, 40 are secured within the cavity 18 by having their leads 58, 60 respectively received within the bores 62, 64 of the retaining cylinders 66, 68 with the cylinders being respectively secured in position within the openings 30, 34 and 32, 36 of the mounting block 28 and wave guide section 14.

The units 38, 40 are isolated from the wave guide wall as well known in the art by the application of an epoxy coating such as Palmer Epoxy 7076–A . Thus, the leads 46, 50 of units 38, 40 may be coated to prevent contact with the bottom wall 22 of the wave guide section 14 in the regions about the openings 48, 56. Of course, where it is desired that the lead 50 of the diode 40 be grounded or connected with the wave guide section 14, the epoxy is not applied. Similarly, epoxy coating is applied to the outer walls of the retaining cylinders 66, 68 to isolate the leads 58, 60 of the units 38, 40 and for firmly cementing the retaining cylinders 66, 68 in position within the openings 30, 32 of the detector mounting block 28.

An electrical connection 70 is provided between the retaining cylinders 66, 68 for effectively electrically connecting in series the units 38, 40. The units are also positioned so that one of the units is connected with the other unit, as schematically illustrated in FIGURE 7*b*, so that their respective output voltages are additive in the same sense. With the units 38, 40 connected as shown, an output voltage generated by the combination of series connected diodes 38, 40 is provided at the terminals 54, 56.

The wave guide section 14 is also provided with a conducting block 72 of metal which has its position adjusted within the cavity 18. For this purpose, a slot 74 is provided in the bottom wall 22 of the wave guide section 14 which receives therethrough a bolt 76 which threadedly engages the block 72 (see FIGURES 4 and 6). A cylindrical spacer 78 is received about the shank of the bolt 76 and engages the bottom wall 22 when the bolt 76 is tightened for fixing the position of the block 72. The block 72 is positionable to provide an adjustable terminating means for the wave guide section 14 for minimizing the reflected energy and providing an impedance match.

In order to carry out the method of the invention, the units 38, 40 are positioned within the cavity 18 of the wave guide section 14 to equally share the power of the R.F. signal converted by the detecting units 38, 40. For the example shown, this is achieved by equally positioning the units 38, 40 from the center line of the wave guide section 14 or equivalently from their side walls 24, 26. The position of each of the detecting units 38, 40 from the vertical line or the side walls 24, 26 of the wave guide 14 is the function of both the crystal type and wave guide dimensions. For each crystal type and different wave guide size, the detecting devices 38, 40 should be positioned for the best match.

Although the signal converting means 10 illustrates the use of two series connected detecting units 38 and 40, a greater number of units may be used for further increasing the D.C. voltage output for the power converted. To achieve this, a branched wave guide could be used to divide the power equally and in each branch one or two diodes may be mounted. Where one unit is mounted in each branch, it would be mounted along the center line and be connected in series with the other unit. Such an arrangement would be useful when the wave guides are too small to accommodate two crystal detectors in the manner illustrated by the means 10. Where each branch can house two units in the manner illustrated in connection with the means 10, then four such diodes may be connected in series to provide increased voltage output.

When the waveguide is sufficiently large to permit the mounting of two or more units, one above the other, then they may all be positioned along the center line or arranged in two vertical banks with two or more units in each bank. The two vertical banks would be positioned in conformity with the spaced arrangement shown for each of the units 38, 40 of the means 10 to allow equal sharing of converted power.

FIGURE 7 schematically illustrates the arrangement of two diode crystal units 80, 82 along the center line 84 of a rectangular wave guide 86 poled for voltage addition, the anode of unit 82 being connected to the guide 86 at 88 while the cathode of diode 80 is connected to an output lead 90 which is isolated at 92 where it passes through the wave guide 86.

FIGURE 7*b* shows the arrangement of two diode crystal units 94, 96 in spaced relationship from the center line 97 of a wave guide 98 poled to provide voltage addition. As previously noted, FIGURE 7*b* is a schematic drawing of the arrangement of the detecting units 38, 40 embodied in the means 10.

FIGURE 8*a* discloses the use of a pair of diode crystal detector units 100, 102 connected for voltage addition and arranged for use in connection with a coaxial line 104. The cathode of unit 100 is connected to the center conductor 106 which is linked by a return 108 to the outer conductor 110. The anode of unit 102 is connected to output lead 112 which passes out of the line 104 and is isolated at 111 from the outer conductor 110.

FIGURE 8*b* shows another arrangement of a pair of diode crystal detector units 114, 116 for deriving a D.C. output signal from the R.F. energy transmitted by a coaxial line 118. The unit 114 has its cathode returned to the outer conductor 120 and its anode coupled by a capacitor 122 to the center conductor 124. The cathode of unit 116 is also joined to the anode of unit 114 while its anode is connected to an output lead 126 which is isolated from the conductor 120 at 128. The method may also be applied to strip line devices and is not particularly limited to the transmitting means for the R.F. signal.

The aforesaid disclosure of method and means for signal converting is illustrative only and should not be construed as limitative of the spirit and scope of this invention as defined by the following annexed claims.

What is claimed is:

1. Signal converting means comprising:

(a) a signal transmission means for transmitting an R.F. signal, (b) a plurality of signal detecting units connected in series for converting the R.F. signals transmitted by said transmission means in which each unit provides a D.C. output voltage signal $E_{dc}$ according to the following equation $$E_{dc}=AP^m$$

where P is the power of the R.F. signal which is converted by a respective one of said units, *m* is an exponent having a value of less than 1, and A is a proportionality factor, (c) said signal detecting units being positioned with respect to said transmission means so that each of said units simultaneously shares the power of the R.F. signal to be converted, (d) and output means connected with said detecting units for deriving a D.C. output voltage signal $E'_{dc}$ from more than one of said series connected detecting units.

2. The means of claim 1 in which said detecting units are positioned with respect to said transmission means to simultaneously equally share the power of the R.F. signal to be converted and maximize the total power converted by said detecting units and including:

(e) terminating means for said transmission means for matching the impedance of said transmission means.

3. The means of claim 2 in which the D.C. output voltage signal $E'_{dc}$ derived from said output means is in accordance with the following equation $$E_{dc}=r^{1-n}(BP_T^n)$$

where $P_T$ is the total power of the R.F. signal which is converted by said detecting units, $r$ is the number of series connected detecting units converting said R.F. signal, $n$ is an exponential factor having a value less than 1, and B is a proportionality factor.

4. The means of claim 3 in which said detecting units are characterized by the equation for $E'_{dc}$ where the exponent $n$ has a value less than eight-tenths of unity.

5. The means of claim 3 in which said detecting units are characterized by the equation for $E'_{dc}$ where the exponent $n$ has a value less than six-tenths of unity.

6. The means of claim 3 in which said detecting units are characterized by the equation $E'_{dc}$ where the exponent $n$ has a value of approximately one-half of unity.

7. Signal converting means comprising:

(a) a signal transmission means including a wave guide for transmitting R.F. signals, (b) a plurality of signal detecting units connected in series for detecting the R.F. signals transmitted by said wave guide in which each unit provides a D.C. output voltage signal equal to $E_{dc}$ according to the following equation $$E_{dc}=AP^m$$

where P is the power of the R.F. signal which is converted by a respective one of said units, $m$ is an exponent having a value less than 1, and A is a proportionality factor, (c) means for positioning said detecting units within the cavity of said wave guide so that each of said units simultaneously equally shares the power of the R.F. signal to be converted and the total power converted by said detecting units is maximized.

(d) and signal output means connected with said detecting units for deriving a D.C. output voltage signal $E_{dc}$ from more than one of said series connected detecting units in accordance with the following equation $$E'_{dc}=r^{1-n}(BP_T^n)$$

where $P_T$ is the total power of the R.F. signal which is converted by said detecting units, $r$ is the number of series connected detecting units converting said R.F. signal, $n$ is an exponential factor having a value less than 1, and B is a proportionality factor.

8. The means of claim 7 in which said detecting units comprise diode crystal devices and includes:

(e) terminating means for said wave guide for matching the impedance of said transmission means.

9. Signal converting means comprising:

(a) a signal transmission means including a coaxial line for transmitting R.F. signals, (b) a plurality of signal detecting units connected in series for detecting the R.F. signals transmitted by said wave guide in which each unit provides a D.C. output voltage signal equal to $E_{dc}$ according to the following equation $$E_{dc}=AP^m$$

where P is the power of the R.F. signal which is converted by a respective one of said units, $m$ is an exponent having a value less than 1, and A is a proportionality factor, (c) means for positioning and connecting said detecting units with said coaxial line so that each of said units simultaneously equally shares the power of the R.F. signal to be converted and the total power converted by said detecting units is maximized, (d) and signal output means connected with said detecting units for deriving a D.C. output voltage signal $E_{dc}$ from more than one of said series connected detecting units in accordance with the following equation $$E'_{dc}=r^{1-n}(BP_T^n)$$

where $P_T$ is the total power of the R.F. signal which is converted by said detecting units, $r$ is the number of series connected detecting units converting said R.F. signal, $n$ is an exponential factor having a value less than 1, and B is a proportionality factor.

10. The means of claim 9 in which said detecting units comprise diode crystal devices and includes:

(e) terminating means for said coaxial line for matching the impedance of said transmission means.

References Cited by the Examiner

UNITED STATES PATENTS

| | | | |
|---|---|---|---|
| 2,441,598 | 5/48 | Robertson | 333—81 |
| 2,713,636 | 7/55 | Jenks et al. | 329—161 |
| 2,810,904 | 10/57 | Blitz | 329—161 X |

ROY LAKE, *Primary Examiner.*

ARTHUR GAUSS, *Examiner.*